Patented May 9, 1950

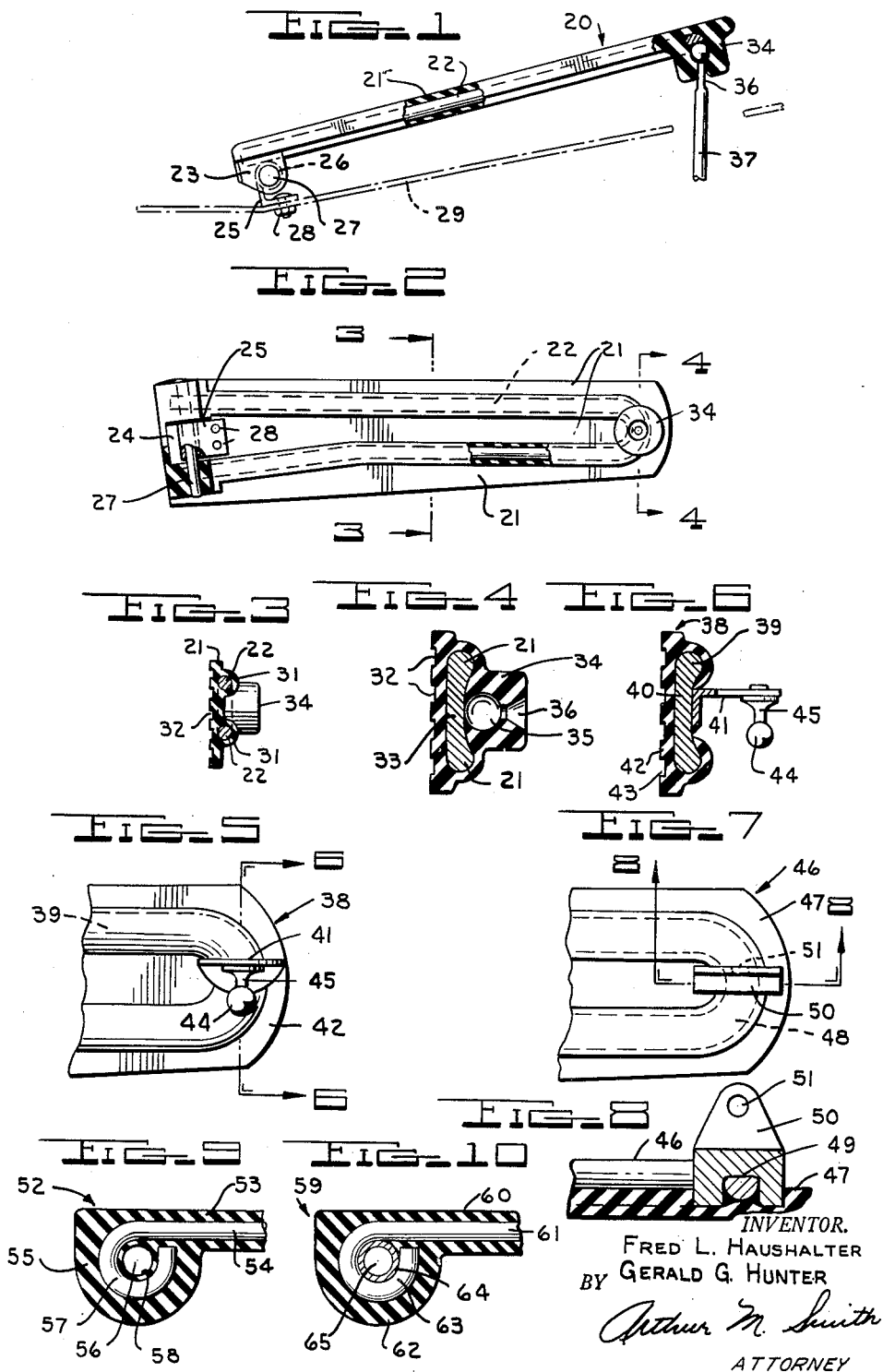

2,507,009

UNITED STATES PATENT OFFICE 2,507,009

PEDAL

Fred L. Haushalter and Gerald G. Hunter, Pontiac, Mich., assignors to Baldwin Rubber Company, Pontiac, Mich., a corporation of Michigan Application November 23, 1946, Serial No. 711,868

13 Claims. (Cl. 74—513)

The present invention relates to improvements in the construction of pedal plates, such as automobile accelerator pedals for example.

Accelerator pedals comprising a steel plate or a sheet metal stamping having a rubber or rubber-like sleeve bonded thereon are known in the art. One of the difficulties experienced with such pedals has been the difficulty and expense involved in making the rubber-like sleeve adhere to the broad surfaces of the metal plate and in preventing the sleeve from working around the plate or from shearing along the broad surfaces thereof. Such pedals usually rely upon the stiffness and strength of the rubber coating to hold itself in place. This reliance has not been entirely satisfactory in the production of first class, long wearing accelerator pedals. Unless the metal plate is especially treated so as to bond the rubber-like sleeve securely thereto, the sleeve will not adhere to the plate. In the normal course of wear and shear between the plate and sleeve, the sleeve works loose and frequently peels away, necessitating the replacement of the pedal.

The above difficulties are encountered whenever a similar article comprising a rubber-like coating over a sheet steel reinforcing plate is subjected to wear or shearing forces. In order to bond the rubber more securely to the reinforcing plate, it is necessary to first coat the plate with a substance such as copper which will bond to the rubber. However, where the article is to be manufactured for a competitive field by mass production methods wherein the margin of profit is necessarily low, as in the mass production of automobile accelerator pedals, the cost of such plates and the cost of the special treatments required to bond the rubber-like coating to such a plate type reinforcing element is often prohibited by the extra cost involved. As a result, an inferior article is often produced. Accordingly, improvements in this art which will produce a better article or which will reduce costs are eagerly sought.

A principal object of the present invention is to provide improvements in the construction of articles comprised of a reinforced plate of hard rubber-like material, and to a method for constructing the same, whereby the reinforcing element for the hard rubber-like material is economically and securely held by the body of the hard rubber-like material without entailing special treatment of the reinforcing element in order to bond it to said hard rubber-like material.

Another object of the present invention is to provide, for the rubber-like body of articles of the character described, an improved reinforcing element formed of relatively inexpensive metal rod or heavy wire stock.

Further objects of the present invention are to provide a pedal embodying the improvements of the present invention wherein a relatively inexpensive metal rod or heavy wire stock is formed and utilized as the reinforcing element for a hard rubber-like pedal body, thereby replacing the more expensive sheet metal reinforcing plate conventionally used and also further reducing the expense and simplifying the construction of such a pedal by eliminating the stamping operation and the cost of the jigs, dies, and fixtures involved in the stamping of a metal reinforcing plate, and thereby also providing a reinforcing element which securely holds the rubber-like body in place and prevents shearing or slipping of the rubber-like material about the reinforcing element without the necessity of specially treating said reinforcing element to bond the rubber-like material thereto.

Another object of the present invention is to provide in a pedal of the character described, an improved, simplified, and reinforced structure for the pivot attachment of the pedal to a base structure such as a floorboard of an automobile; and for an improved and simplified reinforcement for a coupling with an operable member such as an accelerator rod, the coupling being particularly characterized by its resistance to accidental disengagement and the ease with which it may be engaged or disengaged.

A further object of the present invention is to provide a new, improved, simplified and economical method for the production of pedals of the character described by mass production methods.

Other objects of this invention will appear in the following description and appended claims, reference being had to the accompanying drawings forming a part of this specification wherein like reference characters designate corresponding parts in the several views.

Fig. 1 is a side elevation of an accelerator pedal embodying the present invention, portions of the rubber body thereof being broken away and sectioned to show details of construction.

Fig. 2 is essentially a bottom view of the accelerator pedal shown in Fig. 1, portions of the rubber body thereof being broken away and sectioned to show details of construction.

Fig. 3 is a section taken in the direction of the arrows essentially along the line 3—3 of Fig. 2.

Fig. 4 is an enlarged section taken in the direction of the arrows essentially along the line 4—4 of Fig. 2.

Fig. 5 is a fragmentary bottom view of the end portion of an accelerator pedal embodying the present invention and showing a modification of the accelerator rod coupling.

Fig. 6 is a section taken in the direction of the arrows essentially along the line 6—6 of Fig. 5.

Fig. 7 is a fragmentary bottom view of an end portion of an accelerator pedal embodying the present invention and showing a further modification of the accelerator rod coupling member.

Fig. 8 is a section taken in the direction of the arrows essentially along the line 8—8 of Fig. 7.

Fig. 9 is a vertical section of the hinge end portion of an accelerator pedal embodying the present invention and showing a modification of the provision for the pivotal attachment thereof to a floor board.

Fig. 10 is a vertical section of the hinge end portion of an accelerator rod embodying the present invention and showing still another modification of the provision for the pivotal attachment thereof to a floor board.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In brief, the present invention provides an automobile accelerator pedal having a body of rubber or rubber-like material reinforced throughout the length of the pedal by a formed rod of untreated heavy wire or rod stock which is completely embedded within the rubber-like body. By the construction described below, the rubber-like body and the reinforcing metal rod are mechanically locked together. Slipping or shearing of the rubber body about the reinforcing metal rod is prevented. Thus it is unnecessary to give particular attention or treatment to the reinforcing rod stock in order to bond it to the rubber-like body in which it is enveloped.

The invention as briefly described is particularly adapted for manufacture by mass production methods and is simple and economical to manufacture. Relatively inexpensive and untreated rod stock or wire stock is formed or bent into the desired shape and enveloped by the body of rubber or rubber-like material in a molding process which shapes it to the desired outer contour of the accelerator pedal.

It is to be noted that the selection of an accelerator pedal is merely by way of example to show a practical utilization of the present invention, and that the scope of the invention is not so limited, the invention being applicable to a number of articles which present the problem of economically securing a reinforcing element within a body of rubber-like material so as to prevent slipping of the body about the reinforcing element or its shearing therefrom.

Referring to the drawings, and in particular to Figs. 1 through 4, an accelerator pedal indicated generally by the numeral 20 and embodying the present invention is shown wherein a body of hard rubber or rubber-like material 21 completely envelops an essentially U-shaped reinforcing rod 22. On the underside and at the left hand end of the body 21 of the pedal 20 is the downward extending portion 23 of the rubber-like material which provides a slot 24 for the angle bracket 25. The bracket 25 is bent in a loop 26 around the journal pin 27 which is embedded at either end within the downward extending body portion 23. The lower portion of the bracket 25 is secured by the bolt and nut assembly 28 to the floor board 29.

It is to be noted from the drawings, particularly Fig. 3, that the structure made possible by the present invention provides optimum interlocking between the body 21 and the reinforcing rod 22 with a minimum of material required for both. The rod 22 is preferably only partially embedded in the underside of the rubber-like body 21. A downward extension 31 of the rubber-like body 21 tightly envelops the rod 22 so as to securely hold it in place within said body 21. The added thickness 31 required to bond the rod 22 and body 21 together need not be extended across the intervening space between the two arms of the U-shaped rod 22. Furthermore, forces which tend to shear or pull the rubber-like material at 31 away from the rod 22 are resisted by the strong cohesion within the rubber-like material itself, rather than by the relatively ineffective cohesion between the rubber-like material and the rod 22. It is the latter type of cohesion that is necessarily relied upon where the rubber is bonded to a conventional sheet metal reinforcing plate. Accordingly, in order to obtain any degree of effective bonding with the conventional reinforcing plate, it is necessary to incur the additional expense of a special prebonding treatment for the metal plate. In the present invention the two spaced arms of the reinforcing rod 22 mechanically prevent appreciable slipping or turning of the body 21 about said reinforcing rod 22 under shearing stresses, without necessitating a rigid bond between the metal and the rubber. In this and following embodiments of the rod 22, a U-shape is preferred, although it is apparent that the U-shape is not essential for carrying out the spirit of our invention and that formed reinforcing rods of other shapes could also be employed to prevent slipping and turning of the rubber-like body molded or otherwise formed thereon.

Thus it is seen that the construction proposed by the present invention prevents displacement between the reinforcing rod 22 and the rubber-like body 21 essentially independently of the cohesion or bond therebetween. Not only is the expense, required to specially treat the reinforcing rod 22 in order to bond it to the body 21 avoided, but the substitution of relatively inexpensive untreated rod stock for the more expensive sheet metal conventionally used to reinforce pedals of the character described also achieves an economy in the materials required and eliminates the expense of a sheet metal stamping operation and the cost of the accompanying dies and fixtures required for such stamping.

The top surfaces of the pedal 20 as shown in cross section, Figs. 3 and 4, are roughened by a suitable design 32 to increase the friction of the foot engaging surface.

As shown in Fig. 4, the rod 22 has the flattened flare 33 at the bend of the U thereof to provide a broad support for the downward extending portion 34 of the rubber-like material which contains the socket 35. The mouth 36 of the socket 35 opens vertically downward and provides for insertion of the ball-headed accelerator rod 37.

Vertical pressure of the ball-headed accelerator rod 37 against the base of the socket 35 is resisted by the flared portion 33 of the reinforcing rod 22. Thus a ball and socket joint may be effected between the socket 35 and accelerator rod 37 which will prevent the ball head of the accelerator rod 37 from slipping around the edges of the formed rod 22 or from breaking through the rubber-like material at the base of the socket 35.

Figs. 5 and 6 show the end portions of an embodiment of an accelerator pedal indicated generally by the numeral 38 and which has the U-shaped rod 39 flattened and flared at 40 at the bend of the U in a similar manner to the flared portion 33 of the pedal previously discussed. The flared portion 40 provides a suitable base to facilitate welding of the angle bracket 41 thereto. The U-shaped reinforcing rod 39 is enveloped by the body 42 of rubber or rubber-like material as previously described in connection with Figs. 1 through 4. Also the foot engaging surface of the pedal 38 has the corrugated friction grip design 43 as indicated. Secured to the downward extension of the bracket 41 is the ball member 44 which extends from the base 45 perpendicularly to the customary direction of movement of the pedal 38.

Although Figs. 5 and 6 show a ball 44 secured to the base 45 and being adapted to fit into a socket at the end of an accelerator rod to form a ball and socket joint therewith, it is feasible to replace the ball 44 by a socket member which would then be adapted to engage a ball at the end of an accelerator rod and form a ball and socket joint therewith.

Other features of the accelerator pedal 38 are similar to those of the pedal 20 previously discussed. The pedal 38 is adapted to be pivotally connected at one end to the floor board of an automobile so as to provide for vertical pivotal movement of the other end, shown in Figs. 5 and 6, in a direction essentially normal to the corrugated foot engaging surface 43. By the structure shown, the end of the pedal shown in Figs. 5 and 6 is adapted to be coupled to an accelerator rod by a ball and socket joint wherein the axis of the socket is essentially perpendicular to the customary direction of movement of the ball 44. Engagement or disengagement of the ball and socket joint between the ball 44 of the pedal 38 and an accelerator rod may be made by slipping the socket of the accelerator rod over the ball 44 in an essentially horizontal movement. Since the customary operational movement of the accelerator rod end of the pedal 38 is essentially perpendicular to the axis of the ball and socket joint, the ball 44 cannot accidentally become disengaged from the ball and socket joint during ordinary operating conditions.

Figs. 7 and 8 show another embodiment of the present invention wherein an accelerator pedal is adapted to make a readily engageable attachment with an accelerator rod and yet be particularly resistant to accidental disengagement therefrom. The accelerator pedal indicated generally by the numeral 46 has the rubber-like body 47 which envelops the U-shaped rod 48 having the flattened portion 49 at the bend of the U. The flattened portion 49 facilitates attachment by welding of the vertically downward extending bracket 50. The pinhole 51 in the bracket 50 permits a pintle or similar engagement with the end of an accelerator rod.

Fig. 9 shows another embodiment of the pivotal attachment between the pedal of the present invention and the floor board of an automobile. The accelerator pedal indicated generally by the numeral 52 has the rubber-like body 53 enveloping the U-shaped reinforcing rod 54. A downward extending enlarged portion 55 of the rubber-like body 53 provides the journal hole 56. The two ends of the arms of the U-shaped rod 54 are bent to form the essentially parallel loops 57 within the enlargement 55 of rubber-like material, thus providing a journal hole 56 having a wear resistant bearing surface 58 of hard rubber-like material and the strength of the reinforcing loops 57.

Still another embodiment of the present invention providing for a similar pivotal attachment of the pedal to the floor board is shown in Fig. 10. The pedal 59 has the rubber-like body 60 which envelops the formed reinforcing rod 61 and provides the enlarged downward extending rubber-like portion 62. The ends of the formed rod 61 are bent to form the essentially parallel loops 63 which are enclosed within the enlarged portion 62. The bushing 64 is bonded within the journal opening 65 and forms the bearing surface therefore. Various suitable bearing metals for the bushing 64 may be employed, although a section of brass tubing is preferred as a means to provide a bearing which combines high operating efficiency with minimum construction cost.

By the foregoing specification and description we have disclosed important improvements in the economical construction of an accelerator pedal whereby a superior pedal is provided which is particularly adapted to manufacture by mass production methods and which embodies a simplified construction permitting the use of relatively inexpensive materials. By virtue of the present invention a secure mechanical bonding has been achieved between the rubber-like body of the pedal and its reinforcing element without necessitating the expense or the operation of specially treating the reinforcing element as is customarily required to bond rubber to metal. In addition the present invention has achieved important economies and improvements in the construction of an accelerator pedal, particularly in the pedal's attachment to a floor board and to an accelerator rod, and has replaced a relatively expensive sheet metal stamping by a considerably less expensive reinforcing element of wire or rod stock.

We claim:

1. In a pedal having a plate of rubber-like material forming the foot engaging body thereof, the combination of a reinforcing means adapted to hold said foot engaging body in shape and to prevent movement thereof relative to said reinforcing means and comprising a formed metal reinforcing rod enveloped within said foot engaging body, a bracket secured to and having an arm extended essentially perpendicularly to the underside of said reinforcing rod, and one member of a ball and socket joint secured to and extended essentially perpendicularly to the extended arm of said bracket.

2. A pedal essentially as claimed in claim 1 and being further characterized in that said reinforcing rod is flared at the location of attachment of said bracket.

3. In a pedal having a plate of rubber-like material forming the foot engaging body thereof and being adapted for coupling to an operable member, the combination of a reinforcing means adapted to hold said foot engaging body in shape and to prevent movement thereof relative to said reinforcing means and comprising a formed metal reinforcing rod enveloped within said foot engaging body, a bracket secured to and having an arm extended essentially perpendicularly to said reinforcing rod, and a pinhole in said bracket.

4. A pedal essentially as claimed in claim 3 and being further characterized by having said reinforcing rod flared at the location of attachment of said bracket.

5. In a pedal having a plate of rubber-like material forming the foot engaging body thereof and being operatively coupled to a base and to an operative member, the combination of a reinforcing means adapted to hold said foot engaging body in shape and to prevent movement thereof relative to said reinforcing means and comprising a formed metal reinforcing rod enveloped within said foot engaging body, and a support for attachment of a coupling for said operative member and comprising a flared portion of said reinforcing rod.

6. In a pedal having a plate of rubber-like material forming the foot engaging body thereof, the combination of a reinforcing means adapted to hold said foot engaging body in shape and to prevent movement thereof relative to said reinforcing means and comprising a formed metal reinforcing rod partially embedded in the underside of said foot engaging body, the rubber-like material of said foot engaging body being extended therefrom to tightly envelop said reinforcing rod, and a base for attachment of a coupling and comprising a flared portion of said reinforcing rod.

7. In a pedal having a plate of rubber-like material forming the foot engaging body thereof and being adapted to be operatively coupled to a base and to an operative member, the combination of a reinforcing means adapted to hold said foot engaging body in shape and to prevent movement thereof relative to said reinforcing means and comprising a formed metal reinforcing rod enveloped within said foot engaging body, an elastomeric socket formed in an enlargement of the rubber-like material of said body, and a reinforcement for said socket and comprising a flared portion of said reinforcing rod adjacent the base of said socket.

8. In a pedal having a plate of rubber-like material forming the foot engaging body thereof, the combination of a reinforcing means adapted to hold said foot engaging body in shape and to prevent movement thereof relative to said reinforcing means and comprising a formed metal reinforcing rod partially embedded in the underside of said rubber-like body, the rubber-like material of said body being extended therefrom to tightly envelop said reinforcing rod, an enlargement of said rubber-like body, and a journal hole within said enlargement and having the bearing surface thereof comprised of said rubber-like material.

9. In a pedal having a plate of rubber-like material forming the foot engaging body thereof and being adapted to be operatively coupled to a base and to an operative member, the combination of a reinforcing means adapted to hold said foot engaging body in shape and to prevent movement thereof relative to said reinforcing means and comprising an essentially U-shaped metal reinforcing rod having a flared portion at the bend of the U thereof and having the ends of the two arms thereof bent in parallel loops, said reinforcing rod being enveloped by the rubber-like material of said foot engaging body, an enlarged portion of said rubber-like body enveloping said parallel loops at the ends of said U-shaped reinforcing rod, a journal hole within said enlarged portion of said hard rubber-like body and extended through said parallel loops and having the bearing surface thereof of said rubber-like material, and a coupling provided by said pedal for said operative member and reinforced by the flared portion of said reinforcing rod.

10. In a pedal having a plate of rubber-like material forming the foot engaging body thereof and being adapted for pivotal mounting to a base and to be operatively coupled to an operative member, the combination of a reinforcing means adapted to hold said foot engaging body in shape and to prevent movement thereof relative to said reinforcing means and comprising a formed metal reinforcing rod having two substantially parallel arms, an enlargement in said rubber-like body, a cylindrical journal hole provided by said enlargement and having the bearing surface thereof comprised of said rubber-like material, the ends of said two arms of said reinforcing rod being bent in reinforcing loops around said journal opening and within an envelope of the rubber-like material of said enlargement.

11. In a pedal having a plate of rubber-like material forming the foot engaging body thereof and being adapted to be pivotally connected to a base and to be operatively coupled to an operative member, the combination of a reinforcing means adapted to hold said foot engaging body in shape and to prevent movement thereof relative to said reinforcing means and comprising a formed metal reinforcing rod having two substantially parallel arms, a flared portion of said reinforcing rod to provide a support for attachment of a coupling for said operative member, said reinforcing rod being enveloped within the rubber-like material of said foot engaging body, an enlargement in said rubber-like body, a cylindrical journal hole provided by said enlargement and having the bearing surface thereof comprised of said rubber-like material, the end of each of the said two substantially parallel arms of said reinforcing rod being bent in a reinforcing loop around said journal hole.

12. In a pedal having a plate of rubber-like material forming the foot engaging body thereof and being adapted to be pivotally connected to a base and to be operatively coupled to an operative member, the combination of a reinforcing means adapted to hold said foot engaging body in shape and to prevent movement thereof relative to said reinforcing means and comprising a formed metal rod having two substantially parallel arms, an enlargement in said rubber-like body and providing a cylindrical journal hole therein, the end of each of the two arms of said reinforcing rod being bent in a reinforcing loop around said journal hole and within an envelope of the rubber-like material of said enlargement, and a metallic bushing inserted within said journal opening for the bearing surface thereof.

13. In a pedal having a plate of rubber-like material forming the foot engaging body thereof and being adapted for pivotal mounting to a base and to be operatively coupled to an operative member, the combination of a reinforcing means adapted to hold said foot engaging body in shape and to prevent movement thereof relative to said reinforcing means and comprising a formed metal reinforcing rod having two substantially parallel arms, an enlargement in said rubber-like body, a cylindrical journal hole provided by said enlargement, the ends of said two arms of said reinforcing rod being bent in reinforcing loops around said journal opening and within an envelope of the rubber-like material of said enlargement.

FRED L. HAUSHALTER.
GERALD G. HUNTER.

REFERENCES CITED

The following references are of record in the file of this patent:

UNITED STATES PATENTS

| Number | Name | Date |
|---|---|---|
| 713,628 | Garrett | Nov. 18, 1902 |
| 1,151,766 | Duffy | Aug. 31, 1915 |
| 1,218,319 | Rives | Mar. 6, 1917 |
| 1,618,652 | Grant | Feb. 22, 1927 |
| 1,811,269 | Hanson et al. | June 23, 1931 |
| 1,842,528 | Knight | Jan. 26, 1932 |
| 1,902,667 | Sanders | Mar. 21, 1933 |
| 2,334,767 | Hilldring | Nov. 23, 1943 |

Certificate of Correction

Patent No. 2,507,009 May 9, 1950

FRED L. HAUSHALTER ET AL.

It is hereby certified that error appears in the printed specification of the above numbered patent requiring correction as follows:

Column 3, line 68, for the words "of its" read *or its*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*